United States Patent
Haustein et al.

(10) Patent No.: US 7,450,548 B2
(45) Date of Patent: Nov. 11, 2008

(54) MIMO SIGNAL PROCESSING METHOD INVOLVING A RANK-ADAPTIVE MATCHING OF THE TRANSMISSION RATE

(75) Inventors: Thomas Haustein, Berlin (DE); Eduard Jorswieck, Schöneiche (DE); Volker Jungnickel, Berlin (DE); Clemens von Helmolt, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 336 days.

(21) Appl. No.: 10/535,209

(22) PCT Filed: Nov. 10, 2003

(86) PCT No.: PCT/DE03/03713

§ 371 (c)(1),
(2), (4) Date: Dec. 14, 2005

(87) PCT Pub. No.: WO2004/047354

PCT Pub. Date: Jun. 3, 2004

(65) Prior Publication Data

US 2006/0193294 A1    Aug. 31, 2006

(30) Foreign Application Priority Data

Nov. 17, 2002  (DE)  ................ 102 54 384

(51) Int. Cl.
*H04Q 7/00*  (2006.01)
(52) U.S. Cl. ............... 370/334; 370/338; 370/349; 370/436
(58) Field of Classification Search ........ 370/334, 370/436, 338, 349; 375/267, 299
See application file for complete search history.

(56) References Cited

U.S. PATENT DOCUMENTS 7,068,628 B2 *  6/2006  Li et al. .................. 370/334

(Continued)

FOREIGN PATENT DOCUMENTS

JP  2002-44051  2/2002

(Continued)

OTHER PUBLICATIONS

Teletar, E.:"Capacity of Multi-antenna Gaussian Channels" European Transactions on Telecommunications; vol. 10, Nov./Dec. 1999; pp. 585-595.

(Continued)

*Primary Examiner*—Charles N Appiah
*Assistant Examiner*—Michael T Vu
(74) *Attorney, Agent, or Firm*—Staas & Halsey LLP

(57) ABSTRACT

A bidirectional signal processing method uses parallel transmission of digital transmitted data streams in a multiple input-multiple output system. Related art methods generate high bit error rates mostly in singular transmission channels. For this reason, the rank-adaptive signal processing method provides that the number $n_d$ of active subchannels are varied according to the actual channel behavior in order to effect a robust data transmission even in singular radio channels based on a transmit-side and receive-side channel knowledge and a modification of the data vector by a linear matrix vector multiplication while introducing a factor gamma for limiting the maximum transmit power. The maximum transmit power is then only distributed to the currently activated subchannels so that no transmit power remains unused. Another optimization of the number of subchannels $n_d$ occurs when selecting the modulation and encoding methods. During the optimal rank-adaptation according to the water-filling principle, another power is allocated to each subchannel. Another modulation and encoding method is accordingly selected for each data stream. During the suboptimal rank-adaptation according to the channel inversion principle, all subchannels have the same power whereby enabling the data streams to be modulated and encoded in a common source.

17 Claims, 6 Drawing Sheets

U.S. PATENT DOCUMENTS

| | | | |
|---|---|---|---|
| 7,302,009 B2 * | 11/2007 | Walton et al. | 375/267 |
| 2001/0053143 A1 | 12/2001 | Li et al. | |
| 2003/0072379 A1 | 4/2003 | Ketchum | |
| 2004/0136349 A1 * | 7/2004 | Walton et al. | 370/338 |

FOREIGN PATENT DOCUMENTS

| | | |
|---|---|---|
| WO | 02/062002 | 8/2002 |
| WO | 02/082689 | 10/2002 |
| WO | WO 03/050968 A2 | 6/2003 |

OTHER PUBLICATIONS

Lebrun F. Ying T, Faulkner M.: MIMO transmission over a time varying TDD channel using SVD in Electronics Letters; Oct. 25, 2001; vol. 37, No. 22, pp. 1363-1364.

Catreux S. et al.: "Adaptive Modulation and MIMO Coding for Broadband Wireless Data Networks". In IEEE Communications Magazine; Jun. 2002; pp. 108 to 115.

Catreux S; Driessen P; Greenstein L.J.; Attainable Throughput of an Interference-Limited Multiple-Input Multiple-Output (MIMO) Cellular System, IEEE Transactions on Communications; vol. 49, No. 8; Aug. 2001, pp. 1307-1311.

Kiessling M et al,; "Short-term and long-term diagonalization of correlated MIMO channels with adaptive modulation" Conference proceedings; 13th IEEE 2002; Bd. 2; Sep. 15-18, 2002; pp. 593-597; XP010614294.

Jungnickel V. et al.; "A MIMO WLAN based on linear channel inversion" IEE Seminar MIMO ; Dec. 12, 2001; pp. 20/1-6; XP002277765.

Golden G.D. et al,; Detection algorithm and initial laboratory results using V-BLAST space-time communication architecture.; Electronics Letters vol. 35, No. 1, Jan. 7, 1999; pp. 14-16.

Chuah C.; et al. "Capacity Growth of Multi-Element Arrays in Indoor and Outdoor Wireless Channels"; Proc.of IEEE Wireless Commun. And Networking Conf. Chicago IL; Sep. 23-28, 2000 pp. 1340-1344.

Blum R.S.; et al "On Optimum MIMO with Antenna Selection" IEEE Communications Letters; vol. 6, No. 8, Aug. 2002; pp. 322-324.

Chung S.T. et al.; Approaching Eigenmode BLAST Channel Capacity Using V-BLAST with Rate and Power Feedback, Proc. IEEE VTC Fall 2001, Atlantic City NJ, Oct. 7-11, 2001; pp. 915-919.

Khalighi et al., "Water Filling Capacity of Rayleigh MIMO Channels", IEEE, 2001.

JP 2002-44051 (Reference AI) corresponds to US 2001/0053143 (Reference AA).

Haustein et al., "Performance of MIMO Systems with Channel Inversion", Heinrich-Hertz-Institut für Nachrichtentechnik Berlin GmbH., Vehicular Technology Conference, 2002. VTC Spring 2002. IEEE 55th, pp. 35-39.

* cited by examiner

MIMO SIGNAL PROCESSING METHOD INVOLVING A RANK-ADAPTIVE MATCHING OF THE TRANSMISSION RATE

CROSS REFERENCE TO RELATED APPLICATIONS

This application is based on and hereby claims priority to PCT Application No. PCT/DE2003/003713 filed on Nov. 10, 2003 and German Application No. 102 54 384.4 filed on Nov. 17, 2002, the contents of which are hereby incorporated by reference.

BACKGROUND OF THE INVENTION

The invention relates to a bidirectional signal processing method for the parallel transmission of digital transmit data streams in regular and singular radio channels of a multiple input-multiple output (MIMO) radio transmission system having $n_T$ transmit antennas and $n_R$ receive antennas.

A new field of research in the mobile radio technology sector has developed in the last several years proceeding from the discovery by Foschini and Gans that the capacity of mobile radio systems can be substantially increased by simultaneous use of a plurality of antennas at the transmitter and at the receiver. The structural principle of MIMO systems of the type was elucidated by earlier system approaches such as, for example, the known BLAST system G. D. Golden, G. J. Foschini, R. A. Valenzuela, P. W. Wolniansky "Detection algorithm and initial laboratory results using V-BLAST space-time communication architecture", Electronics Letters, vol. 35, no. 1, 1999 ("the Golden et al. reference"). Basically, a plurality of data streams are transmitted simultaneously on the same frequency, at the same time and where necessary also using the same pseudo-random noise code. This can be described by a vectorial transmission equation of the type $$y = Hx \cdot n \tag{a}$$

where x is a vector (identified by boldface notation) containing the simultaneously transmitted signals, y is a vector containing all the receive signals and n is a vector containing the isotropic receiver noise. As perfect a knowledge as possible of the transmission characteristics of the MIMO channel is essential in order to make full use of the available channel capacity, which is to say that the characteristics of the baseband channel matrix H with the complex transmission coefficients between each transmit and each receive antenna must be adequately known on the receive side and where necessary also on the transmit side. This can be achieved for example by known estimation methods on the basis of training sequences. In the following H is normalized such that the mean path loss is equal to 1. The essentially non-causal channel knowledge on the transmit side can be ascertained by the receive side for example by way of a return channel as long as the MIMO channel has not changed in time. In the time division duplex scheme (TDD, e.g. wireless LAN, UMTS-TDD) it is also possible, owing to the reciprocity of the channel, to use the channel knowledge from the opposite direction, as a result of which the return channel is no longer necessary. Building on this, linear or non-linear signal processing can then be applied on the receive side and where necessary also on the transmit side in order to separate the simultaneously transmitted data signals from one another again. This corresponds to a resolution of the linear equation system according to equation (a) based on the transmit vector x.

The currently known system approaches mostly proceed from the basic assumptions that on the transmit side the transmission behavior of the channel is not known and that the channel coefficients are independently and identically distributed (i.i.d.) random numbers according to a complex-value Gaussian distribution (Rayleigh channel). Channel knowledge at the receiver only is a useful assumption for frequency division duplex systems (FDD, many mobile radio networks, e.g. GSM, UMTS-FDD) in which the channel reciprocity does not apply and the above-mentioned return transmission of the channel coefficients would require too large a bandwidth. However, the algorithms for purely receive side separation of the data streams are all the more complex, the closer they approach the theoretically possible capacity limit. What is referred to as "maximum likelihood detection" (MLD) represents the optimum. However, the detection is so complicated and involved that it cannot be used at realistic data rates in realtime-capable systems. For this reason, less complex, suboptimal methods employing direct or recursive interference reduction are generally used, such as e.g. zero-forcing or V-BLAST methods the Golden et al. reference.

However, these suboptimal methods reveal a fundamental problem if the second assumption is infringed. The assumption of an i.i.d. Gaussian distribution is only applicable when a plurality of echo signals occur in the transmission channel. In environments with little dispersion, for example in the case of direct line-of-sight contact of a mobile receiving device in an open-sky location with a high, remote transmission mast, the entries in the channel matrix are no longer independently distributed and correlations occur between the receive signals. In the cited example the signals would only be phase-shifted relative to one another, but because of the almost identical distance from the transmitter would have approximately the same amplitude if no shadowings are present. It is well known that correlated channels generally have a lower transmission capacity than Rayleigh channels, so only relatively little information can be transmitted over them as well.

In the extreme case of occurring correlations the channel matrix H becomes singular, that is to say that no finite pseudo-inverse matrix exists any longer either. Consequently, signal processing methods based thereon cannot be used. Singularities can also occur even without correlations ("keyhole channels"). If the singular value decomposition (SVD(H)= $U \cdot D \cdot V^H$) with a transition of the complex MIMO channel into a transmitter- and a receive-side transformation matrix V and U respectively is applied to such channels together with a quasi-diagonal matrix D in which the ordered singular values $\sqrt{\lambda_i}$ derived from the subchannel-characteristic eigenvalues $\lambda_i$ and otherwise zeroes are present on the left upper main diagonal, it can be seen that one or more of the singular values in the above example are close to zero. It will be explained briefly below, with reference to the very simple zero-forcing method, why signal processing in singular channels is so difficult. If SVD is used for example to form the left-side pseudo-inverse matrix $H^{-1} = V \cdot D^{-1} \cdot U^H$, $D^{-1}$ is also a quasi-diagonal matrix in which the inverse singular values $1/\sqrt{\lambda_i}$ and otherwise zeroes are present on the top left main diagonal. In the case of the receive-side signal reconstruction which corresponds to a resolution of the above equation system (a), in the zero-forcing method the received signal vector y is multiplied by $H^{-1}$. The following holds (reconstructed signals are identified by an apostrophe):

$$x' = x + H^{-1} \cdot n \tag{b}$$

From the viewpoint of the signal detector, therefore, the noise is multiplied by $H^{-1}$. Thus, if one or more singular values as in the above example are equal to zero or are only close to zero, then the corresponding inverse values in $H^{-1}$ are very large. Consequently the noise is hugely increased and many errors will be made in all data streams in the decision concerning a data symbol. In any case the noise is no longer isotropically distributed. With the exception of MLD, which is far too complex for practical applications however, all the known signal processing methods therefore have considerable problems in singular channels. A more general, mathematical description of this problem is based on capacity considerations. From these can be derived the effective dimension of the signal space (Effective Degrees Of Freedom, EDOF) which is determined, inter alia, by the ratio of the transmit power to the noise power at the receiver C. Chuah, G. J. Foschini, R. A. Valenzuela, D. Chizhi, J. Ling and J. M. Kahn, "Capacity Growth of Multi-Element Arrays in Indoor and Outdoor Wireless Channels", Proc. Of IEEE Wireless Commun. and Networking Conf., Chicago, Ill., Sep. 23-28, 2000. This variable is also quite critically dependent on the size of the occurring singular values. The more singular values there are close to zero, the fewer are the dimensions that the signal space has, at least with a small signal-to-noise ratio. If a plurality of data streams are to be transmitted in parallel, then the number of data streams should therefore be matched to the effective dimension of the signal space EDOF. Otherwise serious errors will occur during the data transmission, at least with the simple transmission methods which rely on projection techniques.

Because of their relevance to mobile radio, to a very great extent only signal processing methods for FDD systems are considered at the present time. In these transmission systems there generally exists no channel knowledge on the transmit side, with signal processing being performed solely on the receive side. It is proposed in the literature, for example, to execute a "hard" switchoff of transmitter antennas when singular subchannels occur, in other words, simply not to transmit the corresponding data streams R. S. Blum, J. H. Winters "On optimum MIMO with Antenna Selection", IEEE Communications Letters, vol. 6, no. 8, 2002, pp. 322-324. Power regulation does not take place here. In the Lucent proposal for the extension of the UMTS standard Seong Taek Chung, Angel Lozano, and Howard C. Huang "Approaching Eigenmode BLAST Channel Capacity Using V-BLAST with Rate and Power Feedback", Proc. IEEE VTC Fall 2001, Atlantic City, N.J., Oct. 7-11, 2001, on the other hand, a "soft" switchoff of the transmit antennas is used. On the receive side the modulation and coding are matched to the transmission characteristics for each data stream separately. However, the selection of the modulation and coding method is made at the receiver on the basis of channel knowledge available there and with the inclusion of the characteristics of the spatial signal processing. This information is then communicated to the transmitter via a return channel, which requires less bandwidth compared with the transmission of the entire channel matrix. To date, however, there is an absence of reliable findings concerning how efficiently these methods are really able to handle the available capacity in singular channels.

The nearest related art on which the method is based is described in V. Jungnickel et al. "A MIMO WLAN based on Linear Channel Inversion", IEE Coll. on MIMO Systems, Dec. 12, 2001. In this work it is proposed for a transmission system of the type described at the beginning that the LCI (Linear Channel Inversion) method be used for WLAN applications, particularly for the downlink. Since WLANs are mostly used within rooms, the preconditions for a MIMO system are similar to those in an i.i.d. Rayleigh transmission channel and consequently very good. The method per ser has the advantage that no channel knowledge or signal processing is necessary on the receive side, which means that inexpensive receiving devices can be used. In singular channels in particular, however, the LCI method—like the known ZF and BLAST methods—also reveals significant problems. Exclusively transmit-side signal processing, too, has the disadvantage that the characteristics of the signal processing, which can be predicted only with difficulty, are also included as input into the selection that is to be made of the modulation and coding method for the individual data streams. In this case all the data signals are distributed more or less evenly over essentially all eigenvectors. However, as a result of working with a fixed number of data streams, i.e. also at a constant data rate, the too small eigenvalues then increase the bit error rate for the entire transmission. The bit error rate therefore increases dramatically in singular subchannels. The cause for this is the inversion of singular values equal to or close to zero. In such channels a disproportionately high transmit power is then required in order to be able to transmit the transmit data reliably. The known LCI method, like the methods using exclusively receiver-side channel knowledge, can therefore be used satisfactorily only for channels with sufficient signal dispersion, which are usually to be found only in indoor areas or in heavily built-up areas (e.g. urban streets), and at a constant transmission data rate.

SUMMARY OF THE INVENTION

One possible object of the present invention is therefore to specify, proceeding from the basis of the known linear signal processing method, a modified signal processing method which guarantees reliable data transmission that is insensitive to interferences both indoors and outdoors. At the same time the aim is for the required maximum transmit power to be as low and constant as possible. The signal processing method aims to be low in complexity and therefore realtime-capable.

It also aims to be economical in practical application. The method will be explained in more detail below in its overall appearance and also in relation to the advantageous developments.

The signal processing method is based on the knowledge that the inversion of very small —bad—singular values is the critical point why the bit error rate increases so dramatically in singular channels. It is therefore absolutely essential to avoid mapping the transmit signals onto the eigenvectors associated with the very small singular values. With the signal processing method, the signal processing therefore takes place directly in the eigenvector space of $HH^H$ with a precise assignment of the individual data streams to the eigenvectors or, as the case may be, subchannels. Subchannels or eigenvectors with too small eigenvalues can then simply be switched off by the omission of data streams. As a result of the cyclical checking of the quality of the individual subchannels in the signal processing method, the subchannels can then also be re-attached if there is an improvement in the transmission quality. With the signal processing method the subchannels are therefore occupied only as a function of their transmission quality, as a result of which the number of the $n_d$ currently used subchannels may vary constantly.

Because of the use only of the suitable subchannels there is also no loss of transmit power on poor subchannels. Rather, the maximum transmit power, which can now assume a relatively small value and be kept largely constant, can be optimally distributed over the subchannels used. The selection of the most favorable modulation and coding method also has an influence here on the power distribution. The signal processing method thus represents a rank-adaptive method for a simple connection scheme in the transmission channel which guarantees a reliable data transmission both indoors and outdoors and therefore in any environment—even when singularities occur. At the same time, although the data rate is variable due to the different occupation of the subchannels over time (a variable data rate is, however, non-critical for functions outside of a direct voice or video communication), a constantly low transmit power and a very low bit error rate can nonetheless be guaranteed. Moreover, the connection is not interrupted until the transmit power is no longer sufficient to support even a single data stream. Thus, the connection can also be maintained over comparatively long distances and in singular channels, i.e. the range is increased.

The signal processing method with its signal processing at the transmitter in the eigenvector space of $HH^H$ and the maintenance of the power at a constant level is a step-by-step compromise between the spatial multiplexing (parallel transmission of data streams) in the MIMO system based on the current channel occupation on the one hand and the attainable diversity (multiple reception) for the data streams used as a measure for the reduction of the bit error rate in the case of an increase in the maximum transmit power on the other hand. The transmission rate is optimally matched to the effective dimension of the signal space. At the same time a channel overload in terms of its capacity is avoided. However, signal processing on its own is not sufficient, but instead the modulation and coding of the data streams must also be included in the optimization process in addition with regard to the channel characteristics. An optimal data throughput at constantly low transmit power can only be achieved by the right combination of the individual matching options. The number of currently used subchannels is therefore determined according to this combination. On occasion it may, for example, be more favorable to use a coding and modulation scheme with higher spectral efficiency and instead switch off very noisy channels. Account is taken of this circumstance by the cyclical repetition of the signal processing method, the frequency being determined according to the changes in the channel characteristics over time.

The signal processing method is concerned in particular with transmission systems in TDD mode (e.g. wireless LAN, UMTS-TDD) in which the channel knowledge is available at the transmitter. The method resorts in part to theoretical findings for optimization of the information-theoretical capacity, more particularly to what is referred to as "water filling". Generally the capacity of a MIMO channel can be represented in the form $$C = \log_2 \det\left(1 + \frac{1}{P_N} HRH^H\right) \quad (c)$$

In principle the capacity is at a maximum when the transmit covariance matrix R is diagonal in the eigenvector space of $HH^H$. The method using Lagrange multipliers (optimization subject to the initial condition that the total transmit power is finite) can be applied in order to find the optimal main diagonal elements $P_i$ of R which specify the power distribution to the individual eigenvectors of $HH^H$. This results in a simple equation system which requires that the sum formed from $P_i$ and a noise term $N_i$ which is produced from the above singular values of H is to be equal to an initially unknown constant μ for all eigenvectors. The result is illustrated in FIG. 1 in relation to the related art for a random 4×4 channel. The constant μ can be determined iteratively in a realtime-capable algorithm and consequently the power distribution is then also known. It is revealed that from the capacity viewpoint it is relatively frequently the most efficient solution to switch off channels and redistribute the power made available in this way to better-quality channels.

The essential approach is that the water-filling principle, and also the principle of adaptive channel inversion as a simplified suboptimal form thereof, can be implemented directly in the space of the eigenvectors of $HH^H$ by a structurally very simple, in particular linear, signal processing if the channel matrix H is known with sufficient precision on the transmit and receive side, in other words more particularly in TDD systems. The system design is considerably simplified as a result of the transmit-side channel knowledge and it is possible to get very close to the capacity limit of the channel using simple transmission methods. The channel knowledge on both sides permits in particular a simple matching of the transmission rate to the given channel characteristics, as a result of which, among other things, a reliable transmission in singular channels with precisely predictable error rates is also made possible. This also considerably simplifies the selection of the appropriate modulation and coding method. In an extended form the statistical fluctuations in the transmit power which normally arise due to the transmitter-side signal processing can already be calculated in advance. This then enables cheaper amplifiers with high efficiency levels to be used.

In the interests of a greater understanding of the method, the latter will now be explained in more detail below with reference to the individual steps. The bidirectional signal processing method for robust parallel transmission of digital transmit data streams in regular and singular subchannels of a multiple input-multiple output radio transmission system (MIMO system) having $n_T$ trasnmit antennas and $n_R$ receive antennas with a rank-adaptive matching of the data transmission rate to the currently available total channel capacity while maintaining at a constant level the maximum transmit power $P_{tot}$ as the sum of all subchannel powers $P_i$ where $i=1 \ldots \min(n_T, n_R)$, with the rank-adaptive matching of the data transmission rate in respect of the channel matrix H to the currently available channel capacity being performed by a variation, continuously adjusted to the current channel behavior, of $n_d$ currently used subchannels and the spectral efficiency K of the at least one selected coding and modulation method, comprises the following steps which are to be cyclically repeated:

I) Determination of the channel matrix H on the transmit and the receive side of the MIMO system according to $$y = Hx + n \quad (1)$$

where y=receive vector
x=transmit vector
n=noise vector

First, the channel knowledge H is required at the transmitter and at the receiver. Toward that end, in the course of a training period, for example, short training or pilot sequences are sent in succession in both connection directions, on the basis of which sequences the called station estimates the channel matrix in each case. This information can then be used in each case according to the current transmit direction either for the transmitter-side or for the receive-side signal processing. It is assumed that sufficiently long sequences are used to ensure that the estimation error is negligible. A feedback from the channel matrix to the transmitter via a return channel by the receiver is also possible.

II) Singular value decomposition $SVD(H) = UDV^H$ of the known channel matrix H with the maximum rank $\min(n_T, n_R)$ on the transmit side and on the receive side of the MIMO system for determining the unitary transformation matrices U and V as well as the diagonal matrix D containing the ordered singular values $\sqrt{\lambda_i}$ derived from the eigenvalues $\lambda_i$ of the subchannels on the left main diagonal.

A singular value decomposition of the channel matrix is performed on the basis of the known channel matrix H, i.e. the matrices U, D and V are known on both sides.

III) Modification of the transmit data vector x on the transmit side of the MIMO system by a linear matrix-vector multiplication according to $$x = \frac{1}{\gamma} V Q d \quad (2)$$

where $\gamma = \sqrt{\sum_{i=1}^{n_d} \frac{P_i}{P_{tot}}} =$ amplification factor for limiting the total transmit power $P_{tot}$, where V=right unitary transformation matrix according to II)

where Q=diagonal transmit matrix containing the values $\sqrt{P_i}$ on the left main diagonal and where d=current transmit data vector containing the variable length $n_d \leq \min(n_T, n_R)$ from the support of $n_d$ subchannels for the parallel transmission of the transmit data streams.

At the transmitter the data vector d is modified by a linear matrix-vector multiplication. The constant $\gamma$ is also introduced in order to limit the transmit power or, as the case may be, keep it constant. In principle the length of the data vector d, i.e. the number of data streams $n_d$, is variable here.

IV) Multiplication of the currently received transmit data vector d' on the receive side of the MIMO system where $\gamma U_H$, from which through insertion according to I) and II) it follows $$d^* = \gamma U H y = D \cdot Q \cdot d + \gamma U^H n \quad (3)$$

It holds that: $d^* = \gamma \cdot \tilde{y}$ (the tilde identifies the coordinates of the receive vector in relation to the normalized eigenvectors in the receive space)

$$\Rightarrow \tilde{y} = U^H \cdot y = U^H \cdot U D V^H \cdot x + U^H n = U^H U \cdot D \cdot V^H \cdot \frac{1}{\gamma} \cdot V \cdot Q \cdot d + U^H n$$

$$\Rightarrow \tilde{y} = D \cdot Q \cdot d \cdot \frac{1}{\gamma} + U^H n$$

The matrices D and Q are diagonal matrices. The eigenvalues of the channels in $D^2$ are called $\lambda_1 \ldots \lambda_{nd}$. For the equation (3) one therefore obtains $n_d$ equations of the type according to step V. In a consideration of the effective transmission channels for the data signals the subchannels generated in this way reveal themselves as transparent, that is to say they exhibit no crosstalk to the adjacent channel. The noise vector n is rotated as a result of the multiplication by the unitary matrix $U^H$. In this case the isotropic probability density is preserved, so the generated subchannels exhibit a perfectly isotropic noise distribution. The concluding multiplication by y increases or reduces the noise dependent on the choice of $\gamma$. Compare FIG. 2 in relation to the steps III and IV.

V) Determination of the $n_d$ components $d_k^*$ of the currently received, modified transmit data vector d* from IV) according to $$d_k^* = \sqrt{\lambda_k \cdot P_k} \cdot d_k + \gamma \cdot \tilde{n}_k \quad (4)$$

where $k=1 \ldots n_d$

Analogously to step IV, it also holds here that:

$$\tilde{y}_k = \sqrt{\lambda_k P_k \cdot \frac{d_k}{\gamma} + \tilde{n}_k}$$

VI) Selection of the subchannel powers $P_i$ according to
a) with an optimal rank-adaptive support for all subchannels $P_i > 0$ based on the water-filling principle WF according to $$P_i = \left( \mu - \frac{\sigma_n^2}{\lambda_1} \right)^+ \quad (5)$$

where $(a)^+ = 0$ for $a=0$ and $(a)^+ = a$ for $a > 0$
where $\mu$=fill factor which is chosen so that $$\sum_{i=1}^{n_d} P_i = P_{tot} \Rightarrow \gamma = 1$$

where $\sigma_n^2$=noise power at the receiver (normalizable to 1)
which yields the number $n_d$ of the currently usable subchannels for a modification of the current transmit data vector d according to $$n_d = |\{i : p_i > 0\}| \quad (6)$$

and which yields a variable signal-to-noise ratio according to $$SNR_k^{WF} = \frac{\lambda_i \cdot P_i}{\sigma_n^2} \quad (7)$$

For the technical implementation of the optimal rank-adaptive support for all subchannels $P_i > 0$ according to the water-filling principle WF, the values $P_i$ are first determined as described above. Only data streams for which Pi>0 holds true are supported. In principle the transmission channel now has the characteristics of the additive white Gaussian noise (AWGN) channel for each supported data stream. That the, the resulting signal-to-noise ratio according to equation (7) is different in the individual data streams because the two factors $\lambda_i$ and $P_i$ can turn out different in each case. In particular the $P_i$ are dependent on the maximum transmit power. In most cases only a few data streams or subchannels are used at low transmit power. In order to make optimum use of the available capacity here, the signal data must be transmitted in each subchannel using a matched modulation and coding scheme in each case, as a result of which a different transmission rate is also produced in each stream (see FIG. 3). Accordingly, the signaling overhead is relatively high because ultimately changes are also always produced for the $SNR_k^{WF}$ on account of the fast changes in the channel matrix H and consequently the modulation and coding have to be constantly readjusted individually in all the subchannels. On the other hand the available capacity is used to optimum effect in this way, that is to say that the resulting transmission rate is at a maximum under all conditions.

Alternatively it can also be provided:

VI) Selection of the subchannel powers $P_i$ according to
b) with a suboptimal rank-adaptive support for all subchannels according to the adaptive channel inversion principle ACI where DQ=I where I=unity matrix for a complete interference cancellation according to $$P_i = \frac{1}{\lambda_i}, \quad (8)$$

where the number $n_d$ of the currently usable subchannels is selected for a modification of the current transmit data vector d such that the spectral efficiency K of the transmission is maximized and a constant signal-to-noise ratio is produced according to $$SNR_k^{ACI} = \frac{P_{tot}}{\sigma^2 \sum_{i=1}^{nd} \frac{1}{\lambda_i}} \quad (9)$$

With the suboptimal rank-adaptive support for all subchannels according to the adaptive channel inversion principle ACI, $P_i=1/\lambda_i$ is now set arbitrarily.

As a result the $SNR_k^{ACI}$ is the same for all data streams. However, it then also holds that y≠1. The transmission quality is critically dependent on how many data streams are to be transmitted in parallel. An optimum value must be found for this, based on the maximum transmit power available, so that the data throughput is at a maximum.

VII) Selection of the optimal coding and modulation method based on the determined signal-to-noise ratio $SNR_k^{WF}$ or $SNR_k^{ACI}$ with specification of a bit error rate BER to be complied with, where in case a) of the optimal rank-adaptive channel support, the optimal coding and modulation method is selected in each case for each of the $n_d$ active subchannels or in case b) of the suboptimal rank-adaptive channel support, a common coding and modulation method is selected for all $n_d$ active subchannels.

In both cases a) and b) a simple method can be specified as to how the best combination of space-time coding and spatial signal processing can be found. Use is made here of the fact, based on the knowledge of H already at the transmitter, that the signal quality to be expected following the signal processing at the receiver can be predicted. In particular methods from the field of optical OFDM technology can be applied, wherein the power distribution to different frequencies—in contrast to the MIMO method with its space-dependent power distribution—is to be optimized.

With the optimal rank-adaptive channel support based on the water-filling principle according to case a), the power distribution and the number of data streams used is known in advance. Therefore the values of $SNR_k^{WF}$ are also known. For each data stream it is therefore only necessary to find the modulation and coding method which can just still be transmitted without error with the available individual transmit power. The transmission rate in the individual data stream is therefore maximized. For this purpose a list can be produced indicating which SNR is required for a specific modulation and coding method in order to be able to guarantee a specific bit error rate. The values of $SNR_k^{WF}$ are then compared in each case with the values in the list and in each data stream that method that has the highest spectral efficiency is selected from the possible methods. The selection made must also be known to the receiver. In principle this selection could be made totally independently a second time at the receiver, which essentially has the same channel knowledge. For security, however, the selection made at the transmitter should also be transmitted to the receiver via a signaling channel because the channel estimation at transmitter and receiver can be subject to different errors, for example due to noise and co-channel interferences.

With the suboptimal rank-adaptive support for all subchannels based on the adaptive channel inversion principle ACI according to case b), the $SNR_k^{ACI}$ is the same in all data streams, i.e. the same modulation and coding method can be used in all data streams. In particular the data streams can originate from a commonly coded and modulated source, which greatly simplifies the system design (see FIG. 4). On the other hand a somewhat lower transmission rate must be accepted as the price for these simplifications. However, the optimum combination of selected modulation and coding method and the number of data streams still remains to be found. Toward that end a table can be created to determine which power for supporting a specific modulation and coding method, common to all data streams, which is characterized by its spectral efficiency K (data volume transmissible per 1 Hz per second), is required in the AWGN channel without exceeding a specific bit error rate. Depending on the number of data streams $n_d$ the noise would now increase by the factor $$\sum_{i=1}^{nd} \frac{1}{\lambda_1}.$$

From the comparison with the maximum total power available, a selection is first made, from a table for the required transmit powers as a function of $n_d$ and K, of the combinations of $n_d$ and K which can be implemented with the maximum transmit power. The combination with the modified highest spectral efficiency $n_d \cdot K$ is then selected from this subset. In this way the transmission rate is maximized.

The two systems with an optimal or suboptimal rank-adaptive matching of the subchannels used are in principle exceptionally adaptive in relation to any channel implementations and in each case can attain virtually the theoretically possible capacity in each channel because the transmission rate is maximized. Singular channels are explicitly included in this. At the same time the fluctuations in the transmit power which are normally generated with transmitter-side preprocessing are suppressed. On the other hand, however, the transmission rate is then subject to fluctuations which necessarily have to be tolerated due to the statistical nature of the radio channel. For data applications in particular, however, that should not be a problem. Because of the stable transmit power low-cost, energy-efficient amplifiers can be used.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
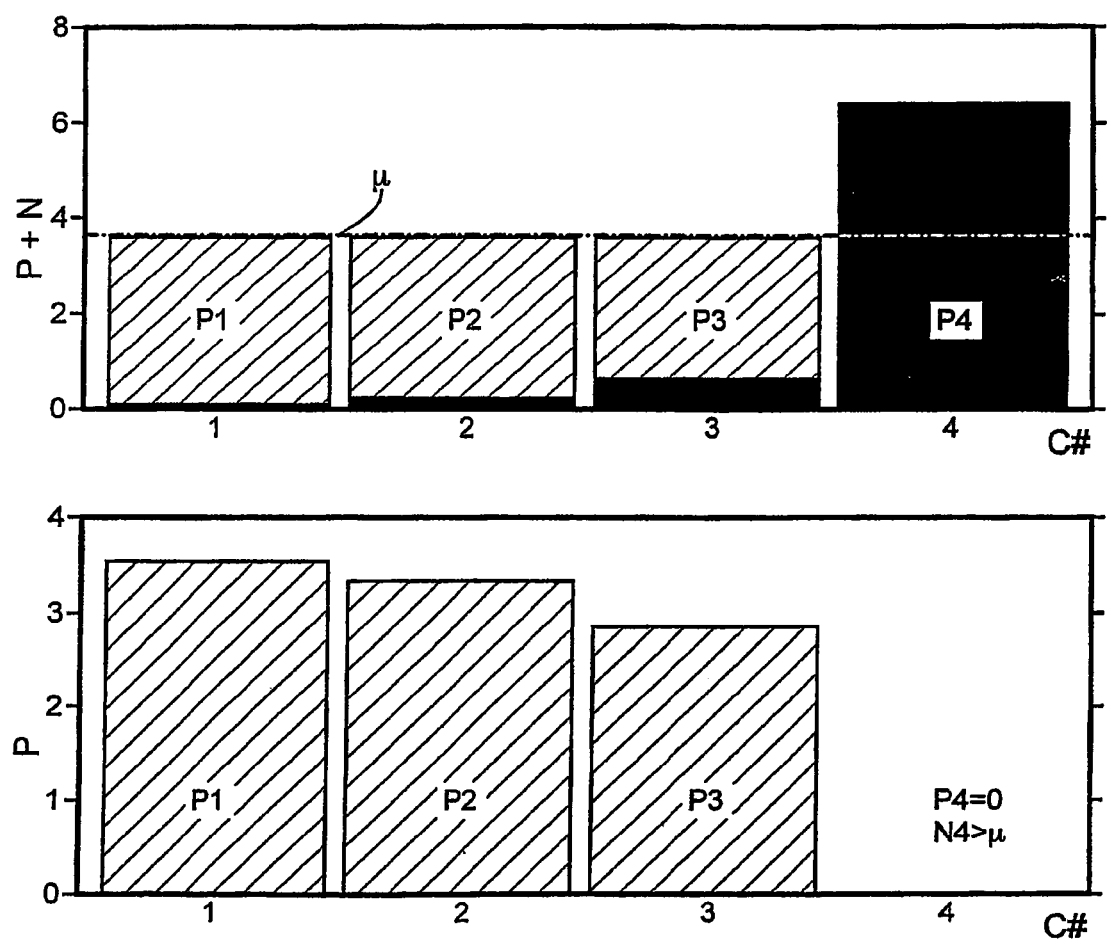
FIG. 1 shows the water-filling principle from the related art.

Reference will now be made in detail to the preferred embodiments of the present invention, examples of which are illustrated in the accompanying drawings, wherein like reference numerals refer to like elements throughout.

FIG. 1 from the related art shows the power distribution according to the water-filling principle in a random Rayleigh channel with four transmitters and four receivers ($n_T=n_R=4$). The top diagram m shows the total formed by the transmit power P (hatched) and 3 N (black), which must be equal to a constant, referred to as the "fill level" $\mu$, for the supported subchannels C# (1 . . . 4). The designation "water filling" is also derived from this constant. The fill level $\mu$ is dependent on the maximum transmit power available. The resulting power distribution is shown in the lower diagram. The fourth subchannel cannot be supported and consequently is switched off. From the viewpoint of the total capacity it is more favorable to distribute the available power to three eigenvectors only. The effective dimension of the signal space is not sufficient for the fourth data stream (equivalent, in the terminology, to subchannel). In this case the power distribution to the three subchannels is firmly predefined. The transmit power not used in the individual subchannels in each case on account of the modulation and coding method selected per subchannel would therefore be lost. However, the unused transmit power can also be redistributed to other channels in order, where necessary, to be able to use there a modulation having higher spectral efficiency. In this case the preferred procedure is such that firstly the entire unused power is collected in a pool. Next, the power in the pool is used in order to increase the spectral efficiency in individual channels. It can be calculated here how much power each channel would need in order to increase the spectral efficiency by one stage. In this case channels already switched off previously are also included. The channel with the lowest power requirement, that is to say with the lowest costs, is preferred when the power is allocated. This "least cost" method is repeated until the power in the pool is no longer sufficient to increase the spectral efficiency.

Figure 2:
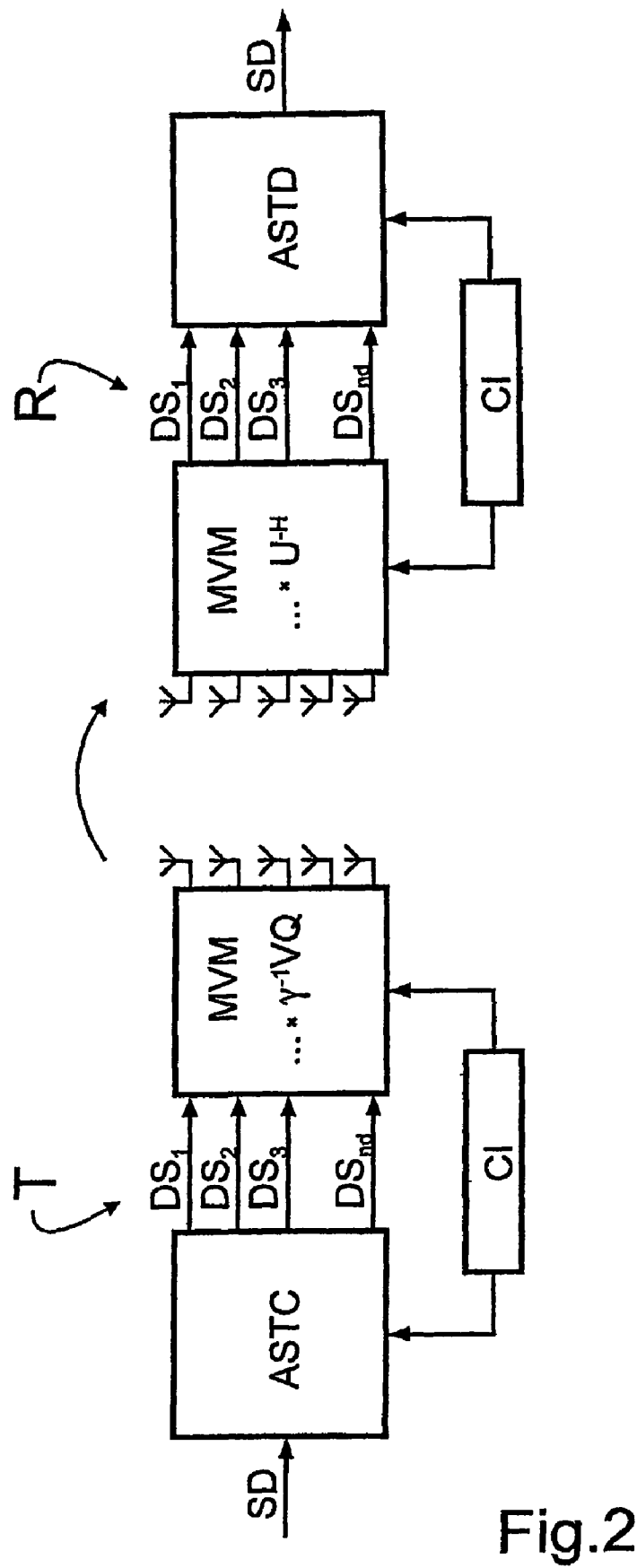
FIG. 2 shows the system structure in principle for the signal processing method according to one aspect of the invention.

FIG. 2 shows the structural principle of an adaptive transmission system for implementing the signal processing method. The essential characteristics of the method can be recognized. First, the knowledge of the channel information CI is required on the transmit side T and the receive side R. The singular value decomposition SVD on both sides of the transmit channel after or, as the case may be, before the adaptive space-time coding or decoding (ASTC or ASTD) is also indicated by a division of the serial data SD into a number $n_d$ of data streams DS1 . . . DS$n_d$ which are correctly coupled into $n_d$ parallel subchannels on account of the SVD. In this case the number $n_d$ of the currently used subchannels is variable as a function of the variable channel matrix H. The optimal $n_d$ is determined by a constantly repeated, power-dependent checking of the transmission quality of the individual subchannels which leads to a disconnection or attachment of individual subchannels. The use of the term "adaptive" is to be understood here in the sense "rank-adaptive" with regard to the channel matrix H whose rank $n_d$ is dependent on the current dispersion conditions in the radio channel and also on the characteristics of the antennas used. The information of the $n_d$ subchannels used can additionally be transmitted to the receive side. Moreover, the usage result should in fact occur on the receive side independently of the result on the transmit side on account of the channel knowledge that is also available there. Due to inaccuracies in the channel estimation, however, an additional transmission to the receiver via a signaling channel makes sense.

Prior to the radio transmission the data vector d, which is composed of $n_d$ components, is modified by a linear matrix-vector multiplication MVM, the left unitary transformation matrix V, die general transmit matrix Q and a factor $\gamma$ being introduced. The latter serves to limit or, as the case may be, keep constant the maximum transmit power available. In the selection of Q there are no restrictions, except that it must be a hermitian positive definite matrix. If all the subchannels are to have the same performance, Q should specifically be selected as $D^{-1}$, where D is the diagonal matrix known as a result of the SVD. Following the transmission of the data vector d, a modification of the received data vector d' is likewise performed on the receive side in the form of a simple matrix-vector multiplication MVM. On the receive side R this is the hermitian, right unitary transformation matrix $U^H$ and the factor $\gamma$. In turn, with the channel knowledge CI, there then takes place an assignment to the $n_d$ individual subchannels and forwarding to adaptive decoding ASTD and signal output SD.

Figure 3:
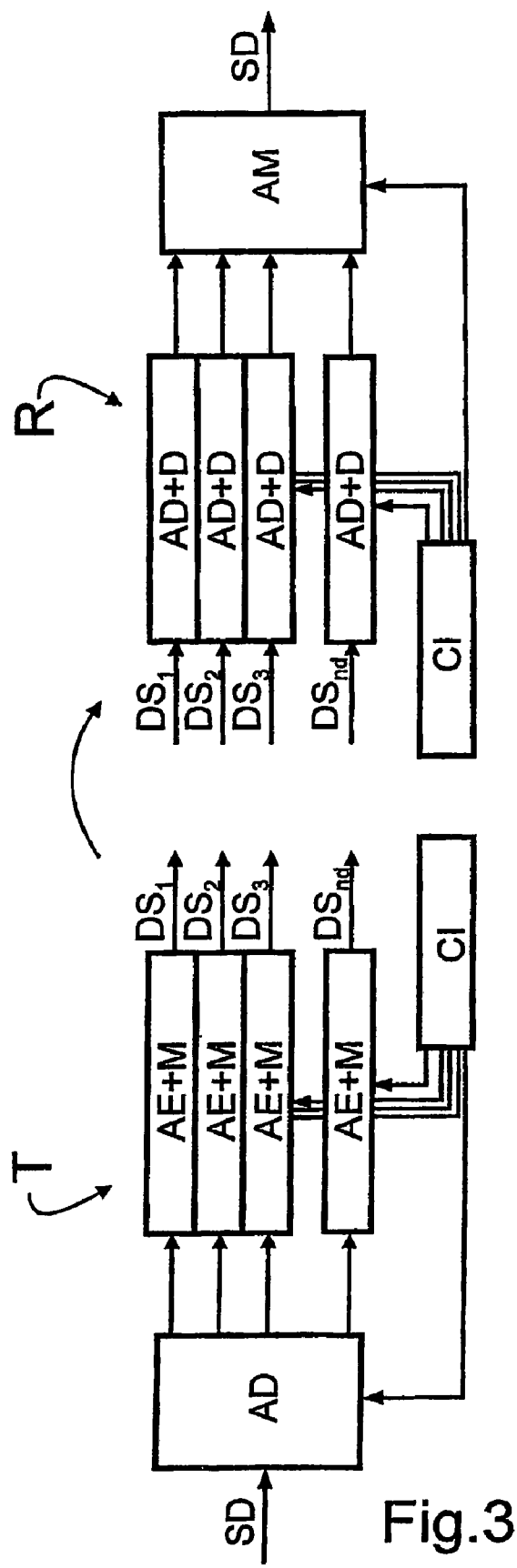
FIG. 3 shows the system structure for the signal processing method according to one aspect of the invention with an optimal rank-adaptive support for the subchannels.

FIG. 3 shows the structure of the adaptive space-time coding and decoding ASTC according to FIG. 1 for the signal processing method with an optimal rank-adaptive support for all subchannels $P_i>0$ based on the water-filling principle WF. Following the adaptive demultiplexing AD of the serial data SD on the transmit side T, the requirement here for each data stream $DS_1 \ldots DS_{nd}$, for which a different signal-to-noise ratio $SNR_k^{WF}$ has been determined is a separate unit for adaptive encoding and modulation AE+M which is optimally matched in each case to the signal-to-noise ratio $SNR_k^{WF}$ that is to be expected for the respective data stream. An analogous situation applies to the receive side R with a unit for adaptive demodulation and decoding AD+D per data stream $DS_1 \ldots DS_{nd}$. The units for adaptive demultiplexing and multiplexing AD/AM must accordingly support different symbol alphabets for each individual data stream. Based on the specifications from the channel information CI, the distribution of the spectral efficiency (bit/Symbol) to the individual data streams $DS_1 \ldots DS_{nd}$ is freely selectable.

Figure 4:
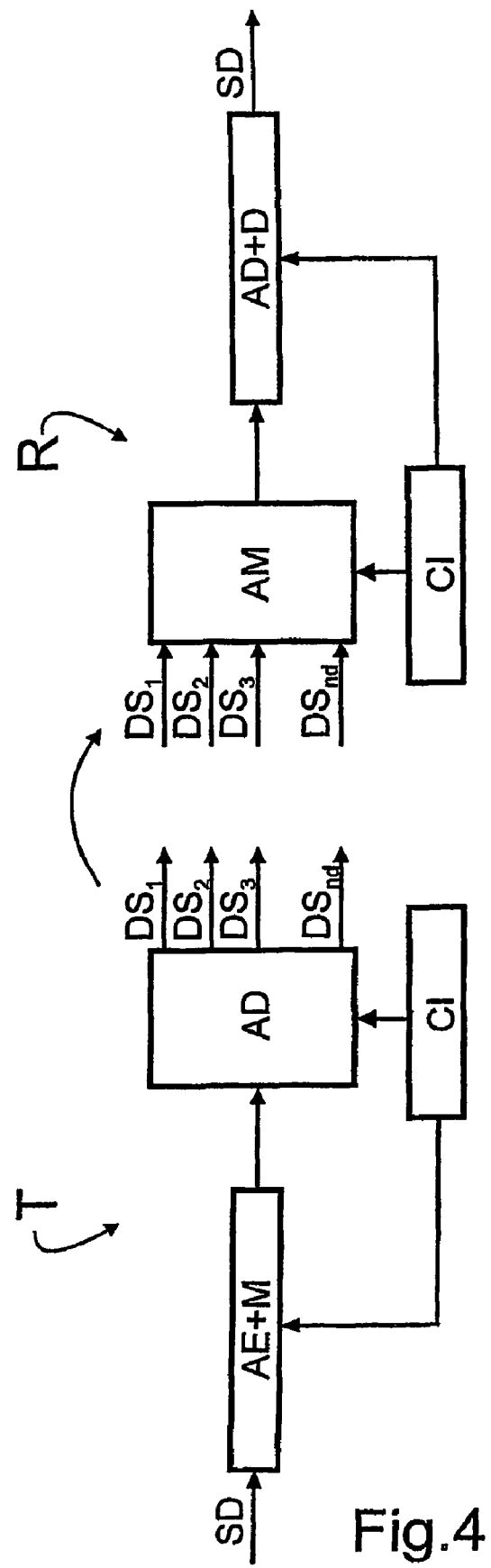
FIG. 4 shows the system structure for the signal processing method according to one aspect of the invention with a suboptimal rank-adaptive support for the subchannels.

FIG. 4 shows the structure of the adaptive space-time coding and decoding for the signal processing method with a suboptimal rank-adaptive support for all subchannels based on the adaptive channel inversion principle ACI. Since in this case the signal-to-noise ratio $SNR_k^{ACI}$ is identical for all active data streams $DS_1 \ldots DS_{nd}$, a common adaptive encoding and modulation AE+M is sufficient on the transmit side T. Since the data rate is also identical in all streams $DS_1 \ldots DS_{nd}$, simple two-way switches can be used for the units for adaptive demultiplexing and multiplexing AE+M in each case for the I and Q signal (real and imaginary part). In addition, a downstream sample-and-hold circuit is required in the encoder for both signals. The two-way switch is driven by the $n_d$ times symbol clock. The common encoding and modulation AE+M is then performed before the adaptive demultiplexing AD. Analogously thereto, a common adaptive decoding and demodulation AD+D of the data streams $DS_1 \ldots DS_{nd}$ is performed on the receive side R following the adaptive multiplexing AM. Overall, the hardware implementation of the space-time coding compared to the signal processing method according to the water-filling principle (see FIG. 3) is somewhat simpler, although the capacity and hence the total data rate for all data streams $DS_1 \ldots DS_{nd}$ is also somewhat lower.

Figure 5:
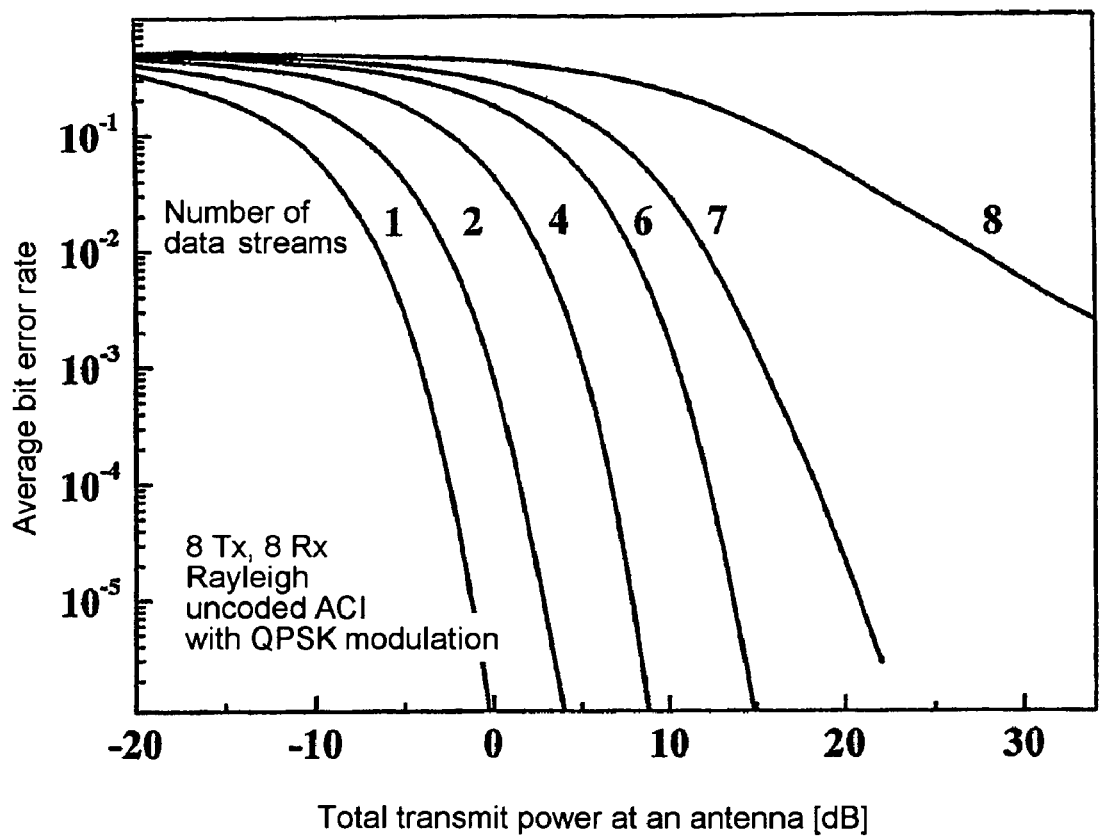
FIG. 5 is a diagram showing the bit error rate as a function of the quotient from transmit and noise power at a receive antenna and FIG. 6 shows in two diagrams the spectral efficiency that can be produced without channel coding according to the suboptimal ACI method compared with the optimal water-filling capacity.

FIG. 5 shows the average bit error rate with adaptive channel inversion at a fixed transmit power for different numbers of data streams (curve parameter: # of data streams) for the modulation QPSK (K=2 bps/Hz) over the signal-to-noise ratio (total Tx power/noise at one antenna [dB]). If a higher-value modulation (e.g. M-QAM, M=16, K=4 bps/Hz) is used, the curves look similar, but are shifted approx. 6 dB to the right (roughly 3 dB per bps/Hz). In order to guarantee a specific bit error rate (e.g. $10^{-5}$) both the number of data streams and the modulation method can be modified. The decision is then made in favor of the combination which permits the highest spectral efficiency at the specified bit error rate. This common optimization is performed in the diagram according to FIG. 6.

Figure 6:
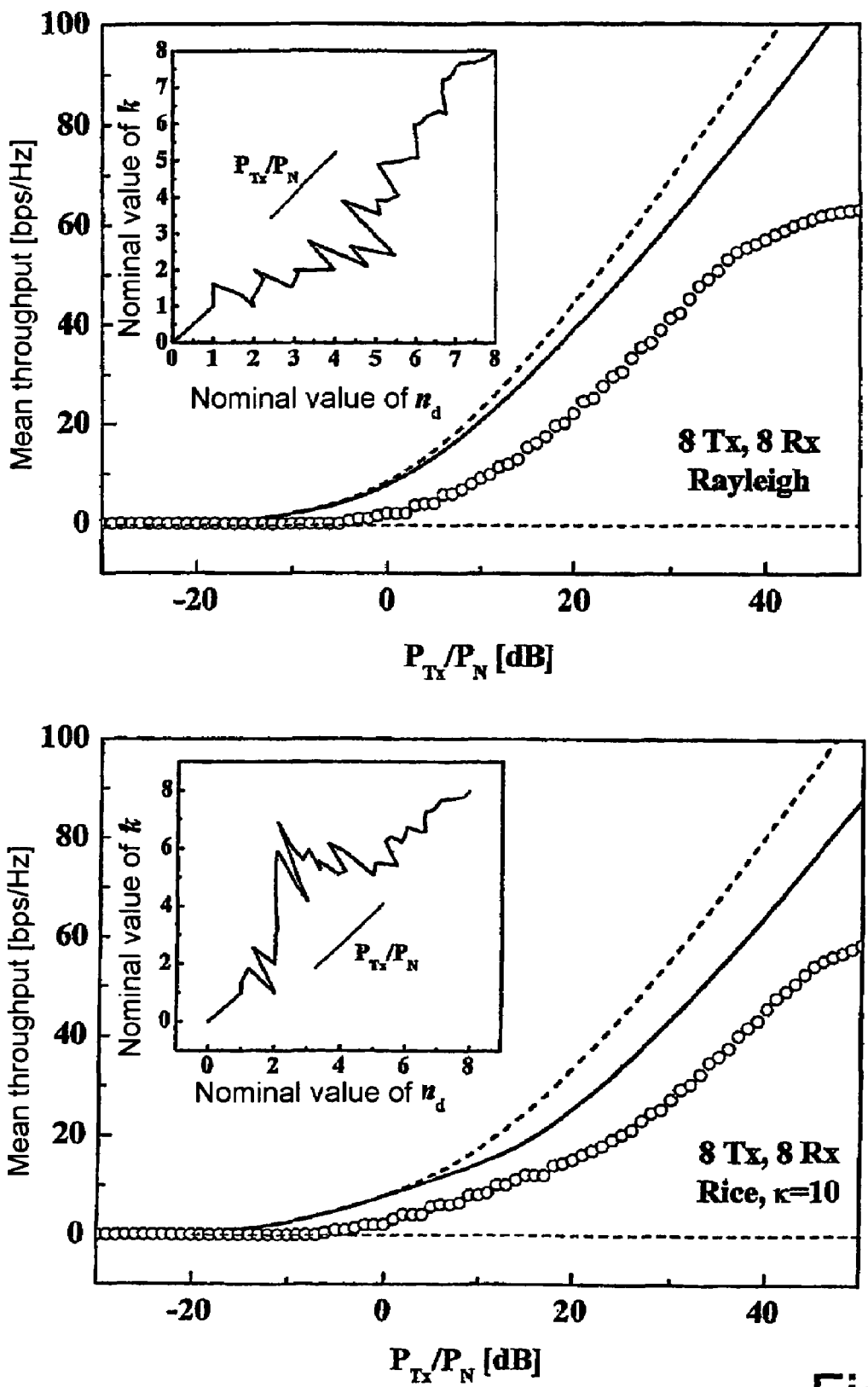

FIG. 6 shows two diagrams in relation to the throughput practically achievable without channel coding (circle curve) compared to the maximum theoretically achievable spectral efficiency according to the suboptimal adaptive channel inversion method (ACI, solid curve) compared to the optimal water-filling method (WF, dashed curve) for a Rayleigh channel (top diagram) and a Rice channel (bottom diagram). In each case the mean throughput [bps/Hz] is plotted over the signal-to-noise ratio $P_{TX}/P_N$ [dB].

The top diagram shows the mean spectral efficiency in the Rayleigh channel without line-of-sight link for uncoded adaptive channel inversion. The dots indicate the actual throughput, averaged over 1000 random channel implementations. The number of data streams $n_d$ and the spectral efficiency of the modulation K have been selected such that the product of both variables is maximized and nonetheless a bit error rate of $10^{-5}$ is still achieved.

An analogous approach applies to the lower diagram, but for a Rice channel with line-of-sight link. The Rice factor κ is 10 and describes the ratio of the powers from the line-of-sight link and diffused-scattered signals. The signal for the line-of-sight link relates to an arbitrarily chosen configuration with two circular arrays with a radius of 4λ which are arranged in a plane at a spacing of 70λ (in this case λ denotes the carrier wave length of the signal). Compared to the Rayleigh channel, the Rice channel has a reduced rank for small transmit powers, resulting in a flatter slope for all curves in the range −15 . . . 10 dB. The adaptive channel inversion ACI can optimally self-adjust to such channels and achieves a satisfactory throughput.

It is noticeable in both diagrams according to FIG. 6 that the curves for the practically achievable throughput (dots) are shifted precisely 8 dB to the right compared to the spectral efficiency that is theoretically possible using the adaptive channel inversion ACI. This is due to the totally uncoded transmission. A large part of these losses (approx. 7 dB) can be offset again with the aid of, for example, turbo coding. In this way it is possible to get very close to the solid curve (capacity limit for the adaptive channel inversion ACI). This notwithstanding, the adaptive channel inversion ACI is still a suboptimal method (comparison with the dashed curve for water-filling WF), i.e. the common coding "costs" a part of the theoretically possible data throughput.

The small inset figures in the two diagrams according to FIG. 6 show how the adaptive channel inversion ACI selects the two parameters $n_d$ (number of subchannels used) and K (spectral efficiency) on an average in order to achieve an optimal throughput. These curves are reproducible for a given set of channel statistics.

The invention has been described in detail with particular reference to preferred embodiments thereof and examples, but it will be understood that variations and modifications can be effected within the spirit and scope of the invention covered by the claims which may include the phrase "at least one of A, B and C" or a similar phrase as an alternative expression that means one or more of A, B and C may be used, contrary to the holding in *Superguide v. DIRECTV*, 69 USPQ2d 1865 (Fed. Cir 2004).

The invention claimed is:

1. A bidirectional signal processing method for the parallel transmission of digital transmit data streams, in regular and singular radio channels, of a multiple input-multiple output radio transmission system (MIMO system), having $n_T$ transmit antennas and $n_R$ receive antennas, that rank-adaptive matches the data transmission rate to the total currently available channel capacity while keeping constant the maximum transmit power $P_{tot}$ as the sum of all subchannel powers $P_i$, where i=1 . . . min ($n_T$, $n_R$) and that rank-adaptive matches the data transmission rate, in respect of a channel matrix H, to the currently available channel capacity by varying and continuously adjusting the current channel behavior of $n_d$ currently used subchannels and the spectral efficiency K of at least one selected coding and modulation method, comprising:

determining the channel matrix H on the transmit and the receive side of the MIMO system according to y=Hx+n, where y=receive vector, x=transmit vector, and n=noise vector;

using a singular value decomposition SVD(H)=UDV$^H$ of the known channel matrix H with a maximum rank ($n_T \times n_R$) on the transmit side and the receive side of the MIMO system to determine unitary transformation matrices U and V and a diagonal matrix D containing the ordered singular values $\sqrt{\lambda_i}$ derived from the eigenvalues $\lambda_i$ of the subchannels on the left main diagonal;

modifying the transmit data vector x on the transmit side of the MIMO system by means of a linear matrix-vector multiplication according to $$x = \frac{1}{\gamma} VQd, \text{ where}$$

$$\gamma = \sqrt{\sum_{i=1}^{n_d} \frac{P_1}{P_{tot}}}$$

= amplification factor for limiting the total transmit power $P_{tot}$, where Q=diagonal transmit matrix containing the values $\sqrt{P_i}$ on the left main diagonal, and where d=current transmit data vector containing the variable length $n_d \leq$ min ($n_T$, $n_R$) for the support of $n_d$ subchannels for the parallel transmission of the transmit data streams;

multiplying the currently received transmit data vector d' on the receive side of the MIMO system by γU$^H$, from which it follows d*=γU$^H$y=D·Q·d+γU$^H$n;

determining the $n_d$ components $d_k^*$ of the currently received and modified transmit data vector $d^*$ according to $d^*_k = \sqrt{\lambda_k} \cdot P_k \cdot d_k + \gamma \cdot \tilde{n}_k$, where $k=1 \ldots n_d$;

selecting the subchannel powers $P_i$ with either:

a) optimal rank-adaptive support for all subchannels $P_i > 0$ based on the water-filling principle WF according to $$P_i = \left(\mu - \frac{\sigma_n^2}{\lambda_i}\right)^+,$$

where $(a)^+ = 0$ for $a=0$ and $(a)^+ = a$ for $a \neq 0$, where $\mu = $ fill factor, which is chosen so that $$\sum_{i=1}^{n_d} P_i = P_{tot} \Rightarrow \gamma = 1,$$

and where $\sigma_n^2 = $ noise power at the receiver, which yields the number $n_d$ of the currently usable subchannels for a modification of the current transmit data vector $d$ according to $n_d = |\{i : P_i > 0\}|$ and which yields a variable signal-to-noise ratio according to $$SNR_k^{WF} = \frac{\lambda_i \cdot P_i}{\sigma_n^2},$$

or b) suboptimal rank-adaptive support for all subchannels based on the adaptive channel inversion principle ACI according to $DQ=I$, where $I=$ unity matrix for a complete interference cancellation according to $$P_i = \frac{1}{\lambda_i},$$

where the number $n_d$ of the currently usable subchannels is selected for a modification of the current transmit data vector $d$ such that the spectral efficiency $K$ of the transmission is maximized and a constant signal-to-noise ratio is produced according to $$SNR_k^{ACI} = \frac{P_{tot}}{\sigma^2 \sum_{i=1}^{n_d} \frac{1}{\lambda_1}};$$

and selecting an optimal coding and modulation method based on a determined signal-to-noise ratio $SNR_k^{WF}$ or $SNR_k^{ACI}$ with a specific bit error rate, BER, to be complied with, where in case a) of the optimal rank-adaptive channel support, the optimal coding and modulation method is selected in each case for each of the $n_d$ active subchannels or in case b) of the suboptimal rank-adaptive channel support, a common coding and modulation method is selected for all nd active subchannels.

2. The bidirectional signal processing method of claim 1, further comprising selecting the optimal coding and modulation method by comparing the determined values $SNR_k^{WF}$ for the currently activated subchannels with SNR values required for a specific coding and modulation method enabling the specified bit error rate, BER, to be complied with using the currently available subchannel powers $P_i$.

3. The bidirectional signal processing method of claim 1, further comprising selecting the optimal coding and modulation method by comparing the determined value $SNR_k^{ACI}$ for all currently activated subchannels with an SNR value required for a specific coding and modulation method enabling the specified bit error rate, BER, to be complied with using the maximum transmit power $P_{tot}$, including a power increase through the support for the currently activated subchannels on the basis of the current transmitter-side singular value decomposition.

4. The bidirectional signal processing method of claim 3, further comprising transmitting the current number, $n_d$, of activated subchannels, as determined on the transmit side, to the receive side via a signaling channel.

5. The bidirectional signal processing method of claim 4, further comprising front-end compensating, on the transmit side, of statistical fluctuations in the maximum transmit power of the MIMO system.

6. The bidirectional signal processing method of claim 5, further comprising selecting a transmit covariance matrix $Q=D^{-1}$ for matching all currently active subchannels to an identical performance, where $$\gamma = \sqrt{\sum_{i=1}^{n_d} \frac{1}{\lambda_1}}.$$

7. The bidirectional signal processing method of claim 6, further comprising a MIMO system which operates according to the Time Division Duplex transmission method.

8. The bidirectional signal processing method of claim 7, further comprising a MIMO system in which the channel estimation in the uplink is reused for the signal processing in the downlink and vice versa.

9. The bidirectional signal processing method of claim 8, further comprising a source commonly coded and modulated on the transmitter side for all the data streams to be transmitted in parallel.

10. The bidirectional signal processing method of claim 9, further comprising decomposing the transmit and receive signal by an OFDM method into a plurality of subcarrier signals, with the bidirectional signal processing method being performed for each subcarrier signal.

11. The bidirectional signal processing method of claim 1, further comprising transmitting the current number, $n_d$, of activated subchannels, as determined on the transmit side, to the receive side via a signaling channel.

12. The bidirectional signal processing method of claim 1, further comprising front-end compensating, on the transmit side, of statistical fluctuations in the maximum transmit power of the MIMO system.

13. The bidirectional signal processing method of claim 1, further comprising selecting a transmit covariance matrix $Q=D^{-1}$ for matching all currently active subchannels to an identical performance, where $$\gamma = \sqrt{\sum_{i=1}^{n_d} \frac{1}{\lambda_1}}.$$

14. The bidirectional signal processing method of claim 1, further comprising a MIMO system which operates according to the Time Division Duplex transmission method.

15. The bidirectional signal processing method of claim 1, further comprising a MIMO system in which the channel estimation in the uplink is reused for the signal processing in the downlink and vice versa.

16. The bidirectional signal processing method of claim 1, further comprising a source commonly coded and modulated on the transmitter side for all the data streams to be transmitted in parallel.

17. The bidirectional signal processing method of claim 1, further comprising decomposing the transmit and receive signal by an OFDM method into a plurality of subcarrier signals, with the bidirectional signal processing method being performed for each subcarrier signal.

* * * * *